United States Patent

[11] 3,565,107

| [72] | Inventor | Russell W. Bunch<br>Portland, Oreg. |
| --- | --- | --- |
| [21] | Appl. No. | 843,880 |
| [22] | Filed | May 26, 1969 |
| [45] | Patented | Feb. 23, 1971 |
| [73] | Assignee | Dillingham Corporation<br>Honolulu, Hawaii<br>a corporation of Hawaii<br>Continuation-in-part of application Ser. No.<br>759,486, Sept. 12, 1968, now abandoned. |

[54] SCUPPER VALVE
13 Claims, 7 Drawing Figs.

[52] U.S. Cl. ................................................. 137/515.7, 137/527.8
[51] Int. Cl. .............................................. F16k 15/03
[50] Field of Search ................................................. 137/515, 515.3, 515.5, 515.7, 527, 527.2, 527.4, 527.8; 251/299, 298, 303

[56] References Cited
UNITED STATES PATENTS

| 314,107 | 3/1885 | Chappeli | 137/527X |
| --- | --- | --- | --- |
| 378,600 | 2/1888 | Lenhart | 137/527.8 |
| 1,000,719 | 8/1911 | Cram | 137/527.8X |
| 2,532,067 | 11/1950 | LaBour | 137/527.8X |
| 3,023,424 | 3/1962 | Litvin | 137/527.8X |
| 3,074,427 | 1/1963 | Wheeler, Jr. | 137/527.4X |

FOREIGN PATENTS

| 1,061,588 | 7/1959 | Germany | 251/303 |
| --- | --- | --- | --- |

*Primary Examiner*—Robert G. Nilson
*Attorney*—Buckhorn, Blore, Klarquist and Sparkman

ABSTRACT: A scupper valve having a disc body formed with bolts holes to mount the body between a pair of pipe flanges. The body is recessed to accommodate a tilt disc and a pivot shaft for the tilt disc. The shaft is retained in position by the flanges between which the body is clamped.

PATENTED FEB 23 1971

3,565,107

RUSSELL W. BUNCH
*INVENTOR*

BY
BUCKHORN, BLORE, KLARQUIST & SPARKMAN
*ATTORNEYS*

RUSSELL W. BUNCH
INVENTOR

BY
BUCKHORN, BLORE, KLARQUIST & SPARKMAN
ATTORNEYS

SCUPPER VALVE

This is a continuation-in-part of my copending application Ser. No. 759,486, filed Sept. 12, 1968 now abandoned.

BODY OF THE APPLICATION

Recently it has become increasingly the practice to load ships beyond that contemplated when the ship was designed. This has the effect of raising the load level line which in effect lowers the positions of the scupper outlets, particularly those normally located just above the water line. In doing this, there is an increased chance of back flow through the scupper lines which can occur if the scupper valves in these lines malfunction. I provide an auxiliary scupper valve downstream of the main scupper valve.

The installation of a conventional scupper valve between the main scupper valve and the scupper outlet would in many instances require alteration in the scupper line and possibly relocation of the existing scupper valve. In many ships, space at the location of the main scupper valve is at a premium and work in such quarters would be time-consuming and expensive.

A main object of the present invention is to provide a thin scupper valve which can be installed in the existing scupper line without alteration of the line. More particularly it is the object to provide a scupper valve having a disclike body which is sufficiently thin that it may be mounted between the outlet flange of the existing scupper valve and the adjacent pipe flange and is equipped with bolt holes to enable it to be secured in place by the same bolts which previously secured such pipe flange and existing scupper valve flange together.

It is another object of the invention to provide such a valve having a tilt disc wholly recessed within the scupper valve body and wherein the tilt disc has an edge located shaft recessed in a simple manner in the scupper valve body and retained in position wholly by one of the flanges between which the scupper valve is mounted.

It is a further object of the invention to provide a scupper valve having a maximum swing of a tilt disc thereof to open the valve to the maximum extent.

Various other objects of the invention will be apparent from the following description taken in connection with the accompanying drawings wherein.

Figure 1:
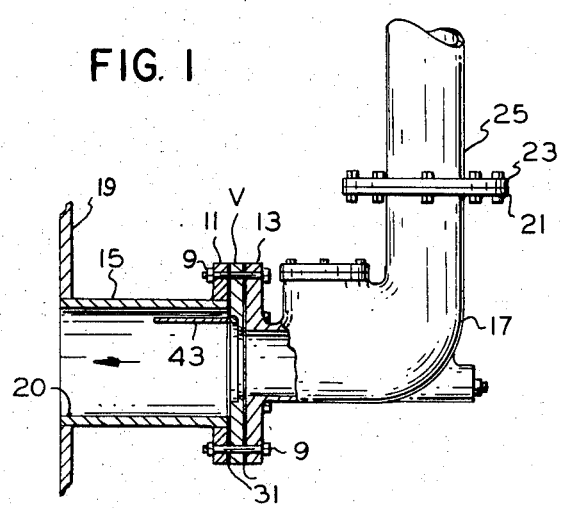
FIG. 1 is an elevational view of the lower portion of a scupper line of a ship showing the auxiliary scupper valve forming one embodiment of the present invention in section.

FIG. 1 shows of scupper valve of the present invention secured by bolts 9 between a pair of flanges 11 and 13, flange 11 being provided as the inner end of a scupper drain pipe 15 and a flange 13 being the outlet flange on a main scupper check valve 17 of conventional construction. Pipe 15 extends to the side 19 of the ship and provides an outlet port 20 through which fluids flowing through pipe 15 exit into the body of water upon which the ship floats.

Main scupper valve 17 has an inlet flange 21 bolted to the flange 23 of a depending pipe 25 which extends upwardly to receive fluids to be discharged through the outlet port 20.

The scupper valve 17 functions to prevent outside water from back flow up through the scupper pipe 25, which would cause unwanted distress above.

When the load level line of the ship is raised for reasons explained hereinbefore, the scupper outlets are lowered and this increases the chance of back flow in the event the main scupper valve 17 malfunctions. To avoid this possibility, a second scupper valve, valve V, is provided downstream of the main scupper valve 17. The valve V being very thin, may be installed without alteration of the scupper line. To do this, the bolts securing flanges 11 and 13 together are removed, the pipe 25 sprung slightly to the right, as the parts are shown in FIG. 1, whereupon the thin scupper valve V is slipped between the flanges, and gaskets 31 inserted in place. Bolts 9 are reinserted and tightened up to secure the peripheral portion of the valve V between the flanges 11 and 13.

Figure 2:
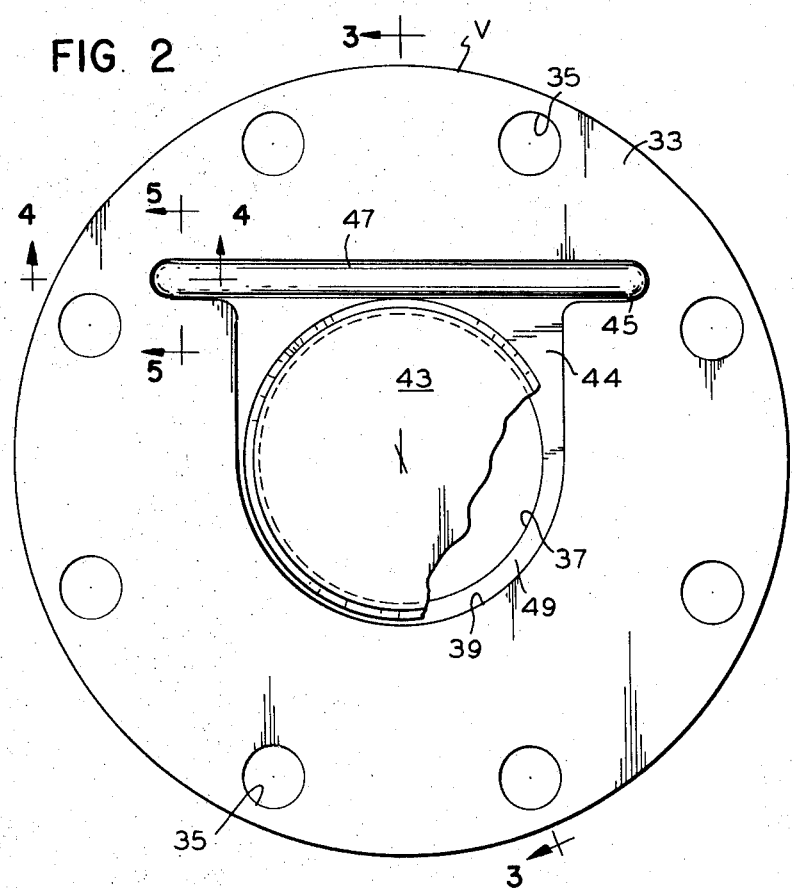
FIG. 2 is a downstream face-on view of the scupper valve of the present invention on a scale considerably larger than that in FIG. 1.

The valve V comprises a flat circular wafer body 33 formed with bolt holes 35 to receive the 9. A flow passage opening or port 37 is formed centrally in the body 33. This opening is counterbored at 39 to provide a seat 49 against which a tilt disc 43 seats. The recessing provided by the counterbore is continued upwardly at 44, as the parts are shown in FIG. 2, and outwardly at 45 to provide space to accommodate a mounting pin or shaft 47 of circular cross section. The pin 47 has its axis offset from the midplane of the disc 43 as is evident from FIG. 3. This provides for clearance between the pin 47 and body 33 in the closed position of the disc thereby assuring that the disc 43 will have positive seating contact with the seat 49 completely around the peripheral portion of the disc 43. If the pin 47 "bottomed out" during seating of the disc 43, the upper portion of the disc, as the parts are shown in FIG. 3, would not seat against the seat, thus allowing leakage back through the valve.

Figure 4:
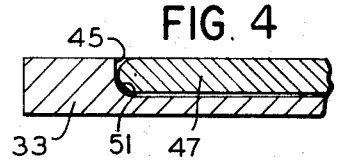
FIG. 4 is a fragmentary horizontal section taken along line 4-4 of FIG. 2.
Figure 5:
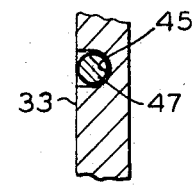
FIG. 5 is a fragmentary vertical section taken along line 5-5 of FIG. 2.

Each recess 45 is U-shaped in cross section as shown in FIG. 5, and has a curved corner 51 (FIG. 4) at its end. Each end of the pivot pin 37 is spherically formed as is evident by comparing FIGS. 2 and 4.

Figure 3:
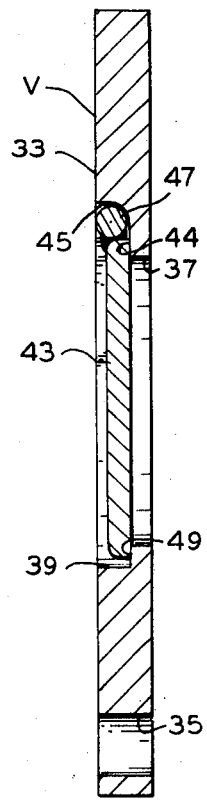
FIG. 3 is a vertical section taken along line 3-3 of FIG. 2.

It is clear from FIGS. 2 and 3 that the seat 49, the surface 44, and the lower portion of the recesses 45 are in the same plane, thus making for ease in manufacture.

FIG. 1 shows the tilt disc 43 in its outward position, this movement being accommodated by the pipe 15 which is of larger interior diameter than the port 37, it being assumed that fluid is flowing out through the scupper pipe.

When the flow ceases, the tilt disc 43 will move downwardly and rest against the seat 49. Water pressure from the ambient water will hold the tilt disc closed against the seat 49. Thus, even should scupper valve 17 fail, there will be no back flow through the scupper valve 17 and pipe 25.

Figure 6:
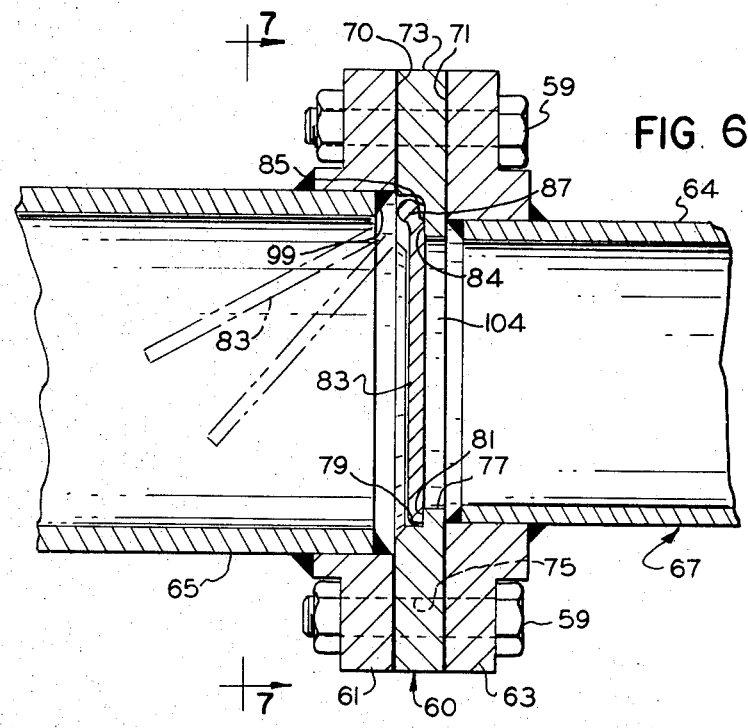
FIG. 6 is a fragmentary, vertical sectional view of the lower portion of a scupper line of a ship showing an auxiliary scupper valve forming an alternate embodiment of the invention.
Figure 7:
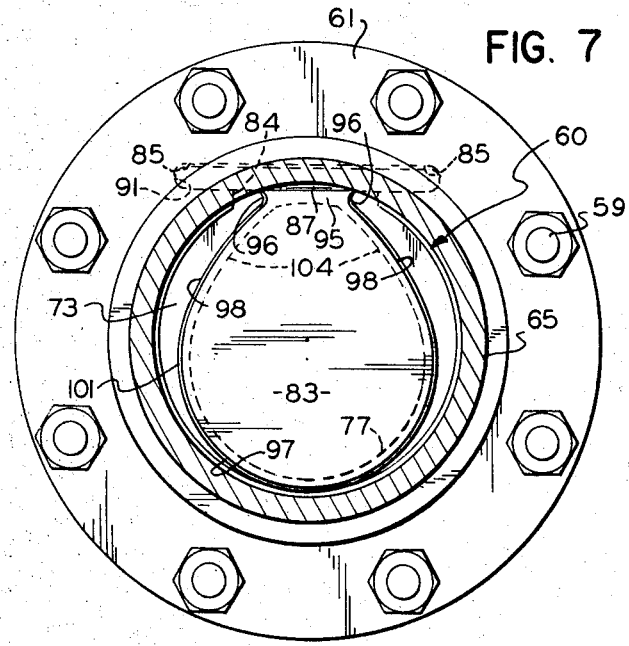
FIG. 7 is a vertical sectional view taken along line 7-7 of FIG. 6.

Embodiment of FIGS. 6 and 7

A scupper valve 60 forming an alternate embodiment of the invention is secured by bolts 59 between a pair of flanges 61 and 63, the flange 61 being integral with the inner end of scupper drain pipe 65 and the flange 63 being on the outlet end of a pipe portion 64 of a main scupper valve 67. The valve 109 comprises a flat circular wafer body 73 clamped between gaskets 70 and 71 and the flanges 61 and 63 and having bolt holes 75 to receive the bolts 59.

A flow passage or port 77 is formed centrally in the body 73. The port 77 is counterbored at 79 to provide a seat 81 against which a tilt disc 83 seats. A recessing provided by the counterbore is continued upwardly at 84, and outwardly in two, aligned grooves 85 to accommodate a mounting pin or shaft 87 of circular cross section. The pin 87 is offset to the left, as viewed in FIG. 6, of the midplane of the disc 83 to provide clearance for positive seating of the disc 83. Each groove 85 is U-shaped in transverse cross section and has a curved corner portion 91 to receive spherical end portions 92 of the pin 87.

To provide maximum flow when the valve 60 is open, the port 77 is substantially pear-shaped and the body of the disc 83 also is substantially pear-shaped This shape makes the port 77 of maximum size while enabling the tilt disc 83 to swing substantially fully open in the cylindrical drain pipe 65. The disc has a narrow neck portion 95 defined by concave or notchlike portions 96, and also has a semicircular lower peripheral portion 97 of one diameter and curved upper peripheral portions 98 of a large diameter which provide a generally elliptical shape of the upper portion of the disc. The narrow neck portion and the generally elliptical upper portion of the disc provide maximum clearance between the disc and beveled transition portion 99 of the pipe 65 and the upper portion of the pipe. The disc also has a bevel 101 which adds to the clearance. The curved portion 98 preferably are circularly arcuate and each has a radius substantially twice that of the circular portion 97. The lower half of the port 77 is circular and the upper half has circularly arcuate portions 104 of a radius over twice that of the lower half of the port and just slightly less than that of the portions 98 of the disc. The periphery of the disc is slightly larger than the periphery of the port, and the two peripheries are, in effect, parallel.

I claim:

1. A valve comprising:
   a body;
   said body being in the form of a disc having opposed flat parallel inlet and outlet faces to facilitate slipping the body between a pair of flanges;
   said body having bolt holes formed therein to enable the body to be secured in place by the bolts of the flanges;
   a tilt disc for said body;
   a pivot shaft at one edge of said tilt disc,
   said body being formed with a flow port and being recessed (a) to provide a seat around said port for said tilt disc, (b) to accommodate said tilt disc, and (c) to accommodate said pivot shaft, whereby to pivotally support said tilt disc; and
   said pivot shaft extending outwardly sufficiently such that its ends are covered by the flanges between which the valve is mounted whereby said shaft is retained by said flanges in the recessed portion of said body.

2. A valve as in claim 1 in which said shaft has its axis parallel to but offset from the plane of said tilt disc in a downstream direction to avoid bottoming out of said shaft when said tilt disc closes.

3. A valve as in claim 2 wherein said recessed portion is all in one plane and wherein the diameter of said pivot shaft is greater than the thickness of said tilt disc.

4. A valve as in claim 1 wherein said body has a generally pear-shaped port and said tilt disc is generally pear-shaped with the smaller end of the tilt disc attached to the pivot shaft.

5. A valve as claimed in claim 4 wherein said tilt disc has a neck portion of a width substantially less than the diameter of the disc.

6. A valve as claimed in claim 5 wherein the width of said neck portion is about one-fourth the diameter of the disc.

7. A valve comprising:
   a body having a generally pear-shaped port having a narrower end;
   a generally pear-shaped tilt disc having a narrower end and adapted to cover said port;
   and pivot means mounting said tilt disc pivotally relative to said body about an axis adjacent the narrower ends of said port and said disc.

8. A valve as in claim 7 wherein said pivot means includes a shaft portion integral with said disc and said body having a recess pivotally receiving the shaft portion.

9. A valve as in claim 8 wherein said shaft portion is connected to said disc by a narrow neck portion.

10. A valve as in claim 8 wherein said shaft is offset laterally relative to said disc.

11. A valve as in claim 8 wherein said disc has a semicircular first half of a predetermined radius and a second half of generally oval shape.

12. A valve as in claim 11 wherein the peripheral portions of said second half are arcuate and of a radius substantially twice that of the first half.

13. The valve as in claim 8 wherein the peripheral portion os said disc is beveled at the side away from said port.